(12) United States Patent
Yester

(10) Patent No.: US 6,662,930 B2
(45) Date of Patent: Dec. 16, 2003

(54) APRON WEIGH FEEDER

(75) Inventor: Martin A. Yester, Allison Park, PA (US)

(73) Assignee: Metso Minerals Industries Inc., Pittsburgh, PA (US)

( * ) Notice: Subject to any disclaimer, the term of this patent is extended or adjusted under 35 U.S.C. 154(b) by 0 days.

(21) Appl. No.: 10/202,859

(22) Filed: Jul. 25, 2002

(65) Prior Publication Data

US 2003/0034237 A1 Feb. 20, 2003

Related U.S. Application Data

(60) Provisional application No. 60/309,134, filed on Jul. 31, 2001.

(51) Int. Cl.$^7$ ............................................... G01G 11/00
(52) U.S. Cl. ................... 198/502.1; 198/817; 198/820; 198/959; 414/21; 177/52; 177/119
(58) Field of Search ................................. 198/817, 820, 198/502.1, 502.3, 959; 414/21; 177/52, 53, 119

(56) References Cited

U.S. PATENT DOCUMENTS

| | | | |
|---|---|---|---|
| 1,537,444 A | | 5/1925 | Herzog |
| 1,647,704 A | | 11/1927 | Lea |
| 1,790,568 A | | 1/1931 | Arnold |
| 1,959,873 A | | 5/1934 | Merrick |
| 2,182,408 A | | 12/1939 | Phillips et al. |
| 2,285,765 A | | 6/1942 | Carswell |
| 2,635,867 A | | 4/1953 | Fogwell et al. |
| 2,830,803 A | * | 4/1958 | Doyle ........................ 177/119 |
| 2,882,036 A | | 4/1959 | Lyons |
| 2,954,113 A | | 9/1960 | Hubbard et al. |
| 3,338,382 A | | 8/1967 | Fogg |
| 3,478,830 A | | 11/1969 | Levesque et al. |
| 3,934,712 A | | 1/1976 | Jende |
| 3,944,050 A | | 3/1976 | Richard |
| 3,955,637 A | * | 5/1976 | Del Rosso .................... 177/52 |
| 4,126,196 A | | 11/1978 | Hyer et al. |
| 4,420,051 A | * | 12/1983 | Furuta et al. .................. 177/25 |
| 4,463,816 A | | 8/1984 | MacFarlane |
| 4,491,279 A | | 1/1985 | Long et al. |
| 4,689,857 A | | 9/1987 | Pinto |
| 4,741,431 A | * | 5/1988 | Whitehead .................. 198/844 |
| 4,823,440 A | | 4/1989 | Pinto |
| 5,024,047 A | * | 6/1991 | Leverett ....................... 53/502 |
| 5,285,019 A | | 2/1994 | Kempf et al. |
| 5,294,756 A | | 3/1994 | Lauber et al. |
| 5,696,354 A | * | 12/1997 | Linville, Jr. et al. ......... 177/119 |
| 5,796,051 A | * | 8/1998 | Chiari et al. ................... 177/17 |
| 5,814,772 A | * | 9/1998 | Nishimura et al. ......... 177/145 |
| 5,873,452 A | | 2/1999 | Nolan |
| 5,927,924 A | * | 7/1999 | Kemmer et al. ............... 414/21 |
| 6,273,665 B1 | * | 8/2001 | Homer, III .................... 414/21 |
| 6,341,930 B1 | * | 1/2002 | Homer, III .................... 414/21 |
| 6,437,255 B1 | * | 8/2002 | Ludescher .................. 177/119 |

* cited by examiner

*Primary Examiner*—Douglas Hess
(74) *Attorney, Agent, or Firm*—Webb Ziesenheim Logsdon Orkin & Hanson, P.C.

(57) ABSTRACT

An apron weigh feeder for use in the heavy bulk materials industry includes a feeder frame, a head drive shaft, a pair of tail traction wheels, and a plurality of carry and return rollers. A pair of drive sprockets is mounted on the head drive shaft. The tail traction wheels are aligned with the drive sprockets, respectively. A pair of endless crawler chains is reeved about the drive sprockets and tail traction wheels, respectively. A plurality of flights is fixed to the crawler chains to define a carrying surface of the apron weigh feeder. The carry rollers support the crawler chains and carrying surface. The carry rollers are supported rotatably by a plurality of carry roller support frames, which are mounted on the feeder frame. The weigh scale assembly is substituted in place of at least one of the carry roller support frames.

20 Claims, 6 Drawing Sheets

APRON WEIGH FEEDER

CROSS-REFERENCE TO RELATED APPLICATION

This application claims the benefit of Provisional Patent Application Serial No. 60/309,134, filed Jul. 31, 2001 and entitled, "Apron Weigh Feeder", the disclosure of which is incorporated herein in its entirety.

BACKGROUND OF THE INVENTION

1. Field of the Invention

The present invention relates to an apron feeder for use in the bulk materials industry and, more particularly, an apron feeder incorporating an integral weighing device.

2. Description of the Prior Art

Apron feeders are typically used in the mining, cement, and other bulk materials industries for extracting bulk materials from bins, hoppers, silos, stockpiles, and the like. The apron feeders are then used to transfer the material to another location. Some specific uses of apron feeders known in the art are applications such as feeding and withdrawing materials from primary crushers, loading and unloading trucks and railcars, removing frozen materials from storage, feeding jaw crushers and belt conveyors, and high abrasion applications frequently found in reclaim circuits. Two examples of apron conveyors known in the art are found in U.S. Pat. Nos. 3,934,712 to Jende and 1,537,444 to Herzog, the disclosures are incorporated herein by reference.

Apron feeders, particularly "tractor type" apron feeders, are often confused with other types of feeders such as pan or belt feeders. Those skilled in the art will appreciate that apron feeders are distinguishable from pan or belt feeders because pan and belt feeders are not capable of being used in the heavy, bulk materials industry such as mining. Apron feeders are uniquely suited for feeding large, lumpy, abrasive, and heavy materials. Pan or belt feeders are not suitable for use with such materials and are typically limited to light duty operations only. Thus, apron feeders are considered in the art to be distinguishable from pan or belt feeders.

Apron feeders come in many different configurations. However, apron feeders generally share certain characteristics in common. Typically, apron feeders include a feeder frame upon which a drive roller is rotatably mounted. A tail roller is located at an opposite end of the feeder frame from the drive roller. A plurality of idler rollers is located between the drive roller and tail roller. Apron feeders further typically include a series of interconnected metal pans or flights that are reeved about the drive roller and tail roller and supported by the idler rollers between the drive roller and tail roller. Two or three strands of endless conveyor chain are often used to drive the pans and material carried thereon.

One known configuration for apron feeders locates the endless conveyor chain outboard of the flights such that the conveyor chain does not directly support the weight of the material on the flights. This arrangement is known as an outboard chain design. Another configuration known in the art for apron feeders was introduced in the early 1970's and is known as a "tractor type" apron feeder. A tractor type apron feeder utilizes tractor type undercarriage chain and rollers that are used on bulldozers and excavators. In the tractor type configuration, one or more conveyor chains are located under the flights. In recent years, tractor type apron feeders, also referred to as crawler apron feeders, have become the preferred design for use in the heavy materials industry.

It is well-known in the art to include a load cell assembly or weighing system with belt conveyors. For example, U.S. Pat. Nos. 4,463,816 to McFarlane; 3,478,830 to Levesque et al.; and 2,882,036 to Lyons are generally directed to belt conveyor weighing systems in which a load cell is located below the belt conveyor for weighing the material received on the surface of the belt conveyor. Specific belt scales for weighing material moving on a belt conveyor supported by an idler assembly are known from U.S. Pat. Nos. 5,294,756 to Lauber et al. and 5,285,019 to Kempf et al. The belt conveyor scale arrangements known from Lauber et al. and Kempf et al. generally disclose the use of a load scale located below an idler support of the belt conveyor. A typical weighing arrangement 10 for a belt conveyor is shown in FIG. 1. The disclosures of each of the foregoing listed patents are incorporated herein by reference.

In FIG. 1, the contents of a hopper or bin 12 may be extracted to an apron feeder 14 located below the hopper 12. To perform a weighing operation, the apron feeder 14 delivers material to a belt conveyor 16 that includes a belt conveyor scale 18. The belt conveyor 16, after weighing the material, delivers the material to a downstream product conveyor 20 through a crusher 22 or other piece of equipment. The arrangement shown in FIG. 1 is well-known in the heavy materials industry. The apron feeder 14 is provided primarily to absorb the heavy weights associated with the extraction of bulk materials from the hopper 12. The weighing step is performed entirely by the belt conveyor 16.

U.S. Pat. No. 4,823,440 to Pinto is directed to a web weight control system for weighing fibers supplied to a carding machine that incorporates an apron conveyor. The apron conveyor includes a weighing device defined by a plunger and a horizontal rod, which bears against the underneath portion of the upper run of the apron conveyor. A transducer is used for sensing the load on the apron conveyor and then sends a weight control signal to a computer. As will be appreciated by those skilled in the art, Pinto discloses the use of an apron conveyor for light, loose fabrics and is not believed to be pertinent to the apron weigh feeder of the present invention, which is specifically directed for use with heavy bulk materials and is a tractor type apron feeder.

In view of the foregoing, an object of the present invention is to provide an apron feeder capable of extracting and weighing heavy bulk materials at the same time with one piece of equipment.

SUMMARY OF THE INVENTION

The above object is accomplished with an apron weigh feeder in accordance with the present invention. The apron weigh feeder of the present invention is intended for use in the heavy, bulk materials industries, such as the mining and cement industries, to extract various types of materials from beneath hoppers, storage bins, silos, reclaim piles, and the like. The apron weigh feeder is a tractor type, also referred to as a crawler type, apron feeder and is capable of weighing extracted material as the material is conveyed from an extraction end to a discharge end of the apron weigh feeder. The apron weigh feeder simultaneously transports and weighs heavy bulk materials.

In general, the apron weigh feeder of the present invention includes a feeder frame, a head drive shaft, a tail traction wheel, a plurality of carry rollers, an endless crawler chain, a plurality of flights, and a weigh scale assembly. The head drive shaft is mounted rotatatably on the feeder frame. The head drive shaft has a drive sprocket mounted thereto. The tail traction wheel is mounted rotatably on the feeder frame at an opposite end of the feeder frame from the head drive shaft. The tail traction wheel is aligned with the drive sprocket. The carry rollers are located and aligned between the drive sprocket and tail traction wheel. The carry rollers are supported rotatably by a plurality of carry roller support frames, respectively. The carry roller support frames are each mounted on the feeder frame. The crawler chain is reeved about the drive sprocket and tail traction wheel. The crawler chain in operation of the feeder moves in a chain path comprised of an upper rectilinear path and a lower rectilinear path connected by two curvilinear paths. The crawler chain is supported by the carry rollers while moving in the upper rectilinear path. The flights are fixed to the crawler chain to define a carrying surface of the feeder. The weigh scale assembly is substituted in place of at least one of the carry roller support frames. The weigh scale assembly is operable to generate an output signal indicative of the weight of bulk material passing over the weigh scale assembly.

The weigh scale assembly may comprise a scale support frame substituted in place of the at least one carry roller support frame and a load cell positioned between the scale support frame and the feeder frame. The load cell is configured to generate the output signal indicative of the weight of bulk material passing over the scale support frame and load cell. The load cell may be operatively connected to a feeder scale configured to display the output signal as the weight of bulk material. The weigh scale assembly may comprise a pair of load cells positioned between the scale support frame and the feeder frame and located on opposite longitudinal sides of the feeder. The scale support frame may support at least two adjacent carry rollers.

The apron weigh feeder may further include a plurality of return rollers mounted rotatably on the feeder frame below the carry rollers. The return rollers are preferably fewer in number than the carry rollers. The sidewalls of the flights may be supported by the return rollers as the crawler chain moves along the lower rectilinear path.

The apron weigh feeder may further include a speed sensor connected to the head drive shaft. The speed sensor is configured to generate an output signal indicative of the rotational speed of the head drive shaft. Control means may be operatively connected to the weigh scale assembly and speed sensor for receiving the output signals from the weight scale assembly and speed sensor. The control means may be configured to calculate the mass flow rate of bulk material carried by the feeder based on the output signals.

The apron weigh feeder may have an extraction end for receiving bulk material onto the flights and a discharge end from which bulk material is discharged from the feeder. The weigh scale assembly is preferably located substantially at the discharge end of the apron weigh feeder.

The apron weigh feeder in accordance with the present invention may have two or more drive sprockets mounted on the head drive shaft and include two or more tail traction wheels aligned with the drive sprockets, respectively. The plurality of carry rollers may be arranged in substantially parallel rolls aligned between respective pairs of drive sprockets and tail traction wheels. An endless crawler chain is preferably reeved about each of the respective pairs of drive sprockets and tail traction wheels. The scale support frame may be configured to support at least two adjacent pairs of carry rollers. The flights may be configured to extend transversely across the multiple crawler chains.

Further details and advantages of the present invention will become apparent from the following detailed description, read in conjunction with the drawings.

DETAILED DESCRIPTION OF THE INVENTION

Figure 1:
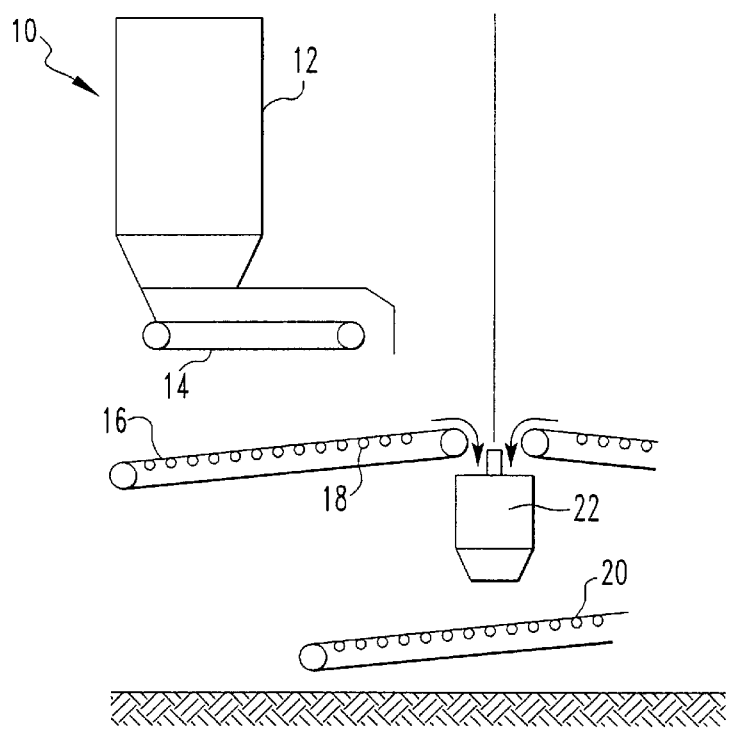
FIG. 1 is a schematic view of a prior art weighing arrangement for weighing heavy bulk materials.

FIGS. 2–5 show the general arrangement for an apron weigh feeder 100 in accordance with the present invention. For ease in explaining the present invention, the apron feeder 100 may be considered to have an extraction end 102 where material is loaded onto the apron feeder 100 and a discharge end 104 where material is discharged from the apron feeder 100. The convention assigned hereinabove is merely exemplary and may be reversed.

The apron weigh feeder 100 includes a feeder frame 106 defined by two substantially parallel support beams 108 and a crossbeam 110. A head drive shaft 112 is mounted to the support beams 108 by bearings, preferably double-row, self-aligning spherical roller bearings. The head drive shaft 112 is preferably located at the discharge end 104 of the apron feeder 100. The bearings are preferably designed for approximately one hundred thousand hours of B-10 life. A pair of drive sprockets 114 is mounted to the head drive shaft 112. In particular, the drive sprockets 114 may be bolted to a drive hub 115 that is keyed to the head drive shaft 112. The drive sprockets 114 are preferably spaced uniformly apart on the head drive shaft 112. The head drive shaft 112 is driven by a mechanical or hydraulic drive and motor 116. A speed sensor 118 is located at an opposite end of the head drive shaft 112 from the drive motor 116, which is used to control the speed of the apron feeder 100. The speed sensor 118 detects the speed of the head drive shaft 112 in rotations per minute (RPM) and will further detect when there is zero/no speed at the head drive shaft 112. The detected speed is sent to a PC/PLC (i.e., control means) and subsequently used to vary the speed of the apron feeder 100 to obtain the desired feed rate in tons per hour or pounds per hour, as discussed herein. The drive motor 116 is preferably a variable speed drive motor, which is also controlled by the speed sensor 118 and may include a variable frequency drive (VFD) or hydraulic drive unit.

Figure 3:
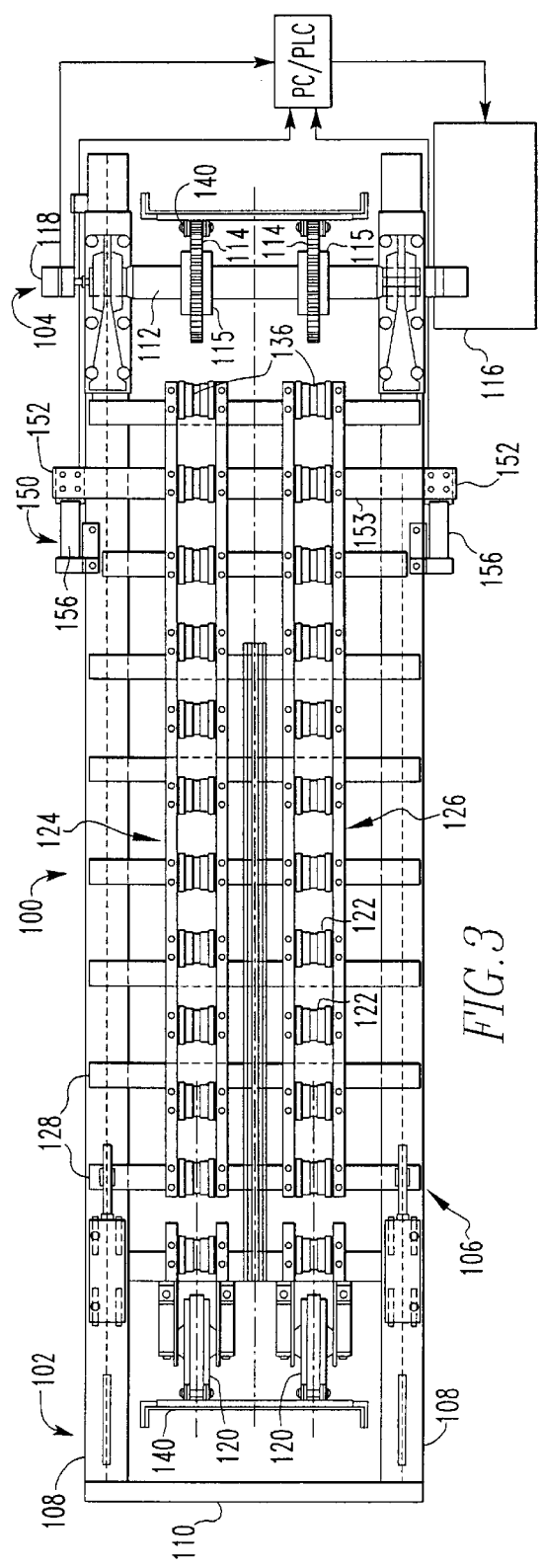
FIG. 3 is a plan view of the apron weigh feeder of FIG. 2, with flights and crawler chains of the apron feeder removed for clarity.

A pair of tail traction wheels 120 is located at the extraction end 102 of the apron feeder 100. The pair of tail traction wheels 120 is aligned with the drive sprockets 114, respectively. A plurality of carry rollers 122 is located between the head drive shaft 112 and the tail traction wheels 120. The carry rollers 122, as shown in FIG. 3, are arranged in two parallel rows 124, 126 between the drive sprockets 114 and tail traction wheels 120. Preferably, the carry rollers 122 are mounted in pairs on respective carry roller support frames 128, which are fixed to the support beams 108 of the feeder frame 106. The rows 124, 126 of carry rollers 122 are aligned with the drive sprockets 114 and tail traction wheels 120. Additional "parallel" rows of drive sprockets 114, tail traction wheels 120, and carry rollers 122 may be used in the apron feeder 100. Further, only one centrally located drive sprocket 114, tail traction wheel 120, and row of carry rollers 122 are necessary for the operation of the apron feeder 100. Thus, the apron feeder 100 may include more than two rows 124, 126 of carry rollers 122.

The tail traction wheels 120 are preferably "shaftless" tail traction wheels. The tail traction wheels 120 are preferably rotatably mounted to the first carry roller support frame 128 located at the extraction end 102 of the apron feeder 100. Alternatively, the tail traction wheels 120 may be commonly mounted on a shaft in a similar manner to the drive sprockets 114 and head drive shaft 112 discussed previously.

The carry rollers 122 are preferably closely spaced along the longitudinal length of the feeder frame 106 and a typical spacing for the carry rollers 122 may be about thirteen to twenty inches depending on the intended application and duty of the apron feeder 100. A plurality of return rollers 130 are rotatably mounted to the feeder frame 106 below the carry rollers 122. The return rollers 130 may be fewer in number than the carry rollers 122. The return rollers 130 are preferably bolted to the webs of the support beams 108 of the feeder frame 106. The return rollers 130 are located below the carry roller support frames 128. The return rollers 130 may be aligned vertically below the rows 124, 126 of carry rollers 122.

A pair of crawler chains 132 is reeved about the drive sprockets 114 and tail traction wheels 120, respectively. Teeth 134 of the drive sprockets 114 cooperate with the individual links of the crawler chains 132 to drive the respective crawler chains 132, as is known in the art. The carry rollers 122 and tail traction wheels 120 are each preferably formed with a central recess 136 configured to receive the crawler chains 132 and restrain the lateral movement of the crawler chains 132 during operation of the apron feeder 100. The crawler chains 132 are preferably tractor type chains having hardened links, pins, and bushings. Preferably, the crawler chains 132 are a sealed type or a sealed and lubricated track type as are known in the art.

A plurality of pans or flights 140 is fixed to the crawler chains 132 to define a carrying surface of the apron feeder 100. The individual flights 140 are fixed to the crawler chains 132 with heavy duty high strength bolts 141. The flights 140 extend transversely across the apron feeder 100 with respect to the longitudinal axis of the apron feeder 100. The flights 140 are preferably made of a material resistant to high impact loading and abrasive operations such as austenitic manganese steel with a stiffened underside for additional strength. The return rollers 130 are attached to the webs of the support beams 108 of the feeder frame 106 so as to support the sidewalls of the flights 140 during operation of the apron feeder 100.

Figure 7:
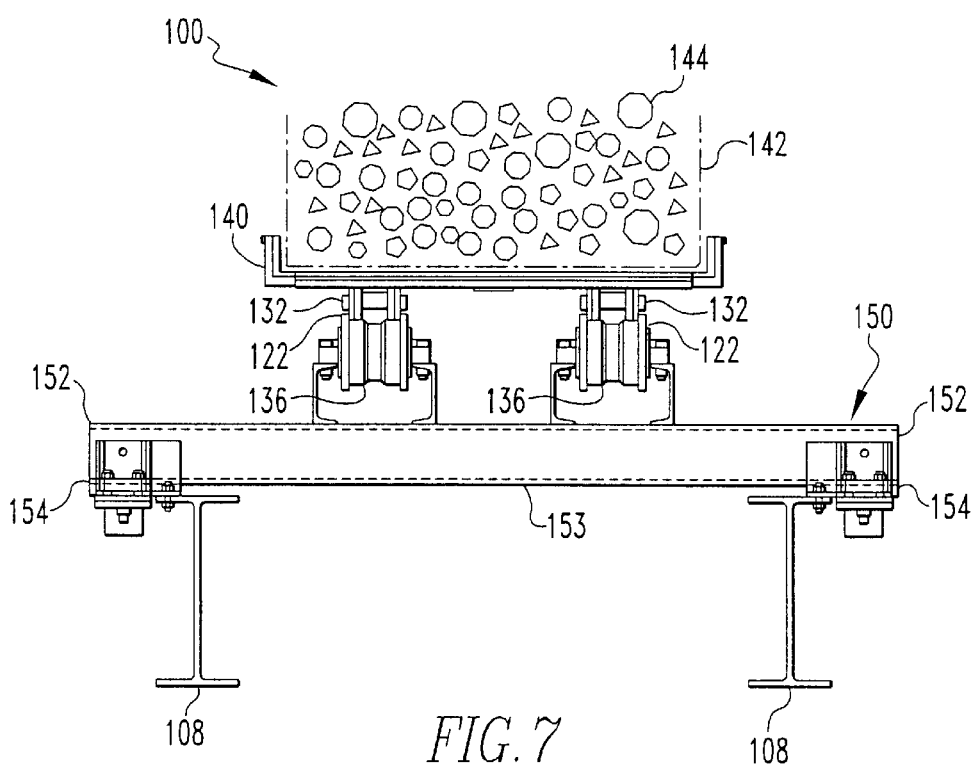
FIG. 7 is a sectional view taken along lines 7—7 in FIG. 6.
Figure 8:
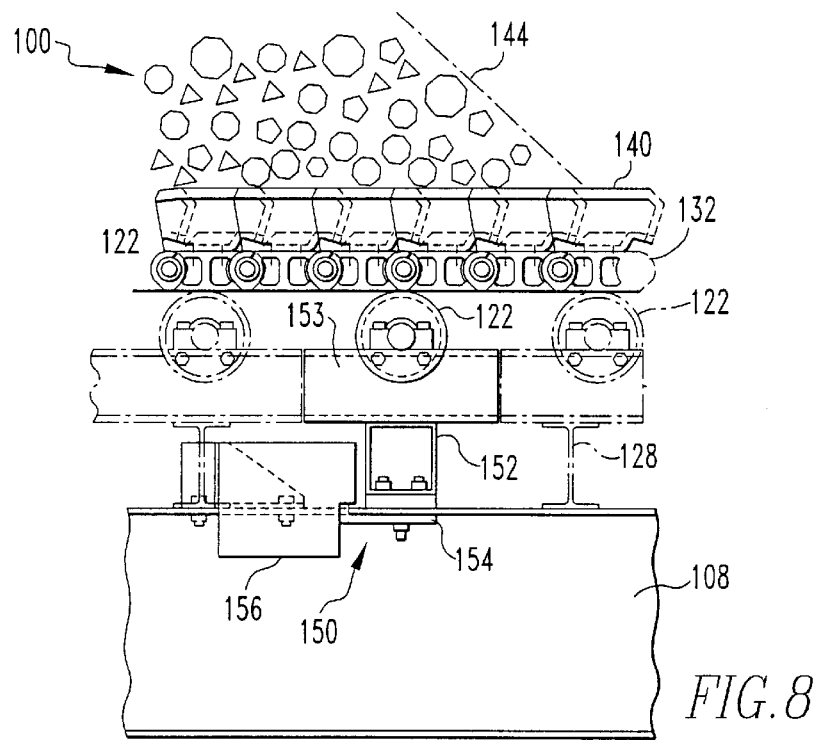
FIG. 8 is an elevational view showing the portion of the apron weigh feeder having the weigh scale assembly of FIG. 6.

The flights 140 and crawler chains 132, in operation of the apron feeder 100, move in a path comprised of an upper rectilinear path and a lower rectilinear path connected by curvilinear paths. The flights 140 and crawler chains 132 are supported by the carry rollers 122 while moving in the upper rectilinear path. The crawler chains 132 are engaged by the drive sprockets 114 as the crawler chains 132 move about the curvilinear path at the discharge end 104 of the apron feeder 100. Similarly, the crawler chains 132 are engaged by the tail traction wheels 120 as the crawler chains 132 move about the tail traction wheels 120 in the curvilinear path located at the extraction end 102 of the apron feeder 100. The return rollers 130 support the sidewalls of the flights 140 as the flights 140 and crawler chains 132 move along the lower rectilinear path. The flights 140 are preferably formed with an overlapping design to provide a tight seal and prevent leakage of material from the apron feeder 100. As shown in FIG. 7, discussed hereinafter, the flights 140 may include skirts 142 for restraining material 144. The skirts 142 are preferably not attached to the flights 140 but are designed to clear the flights 140 by approximately ½ inch (12 mm).

Figure 2:
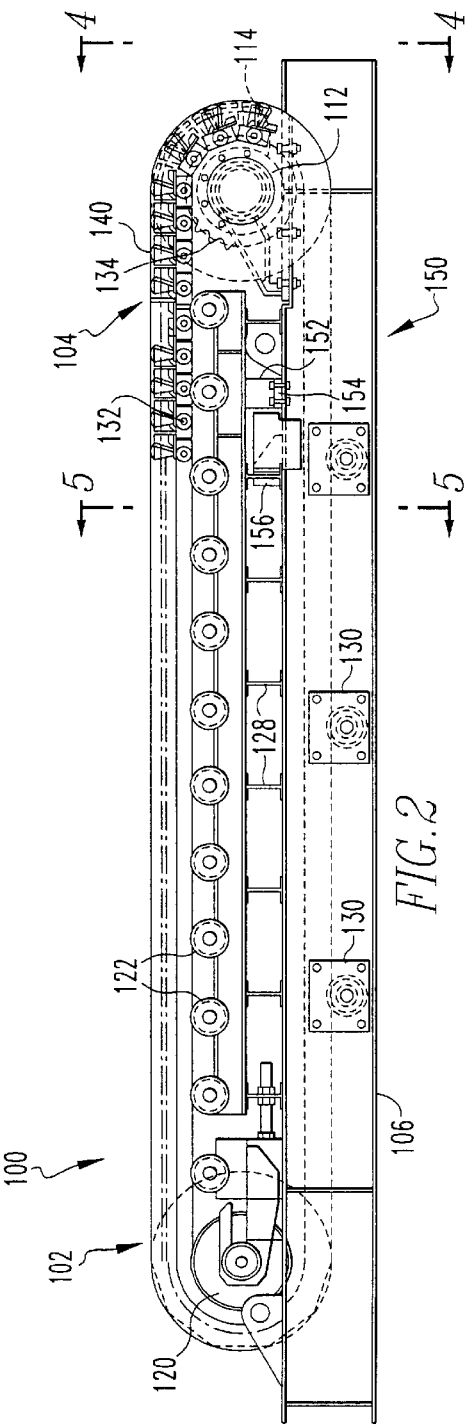
FIG. 2 is an elevational view of an apron weigh feeder in accordance with the present invention.
Figure 4:
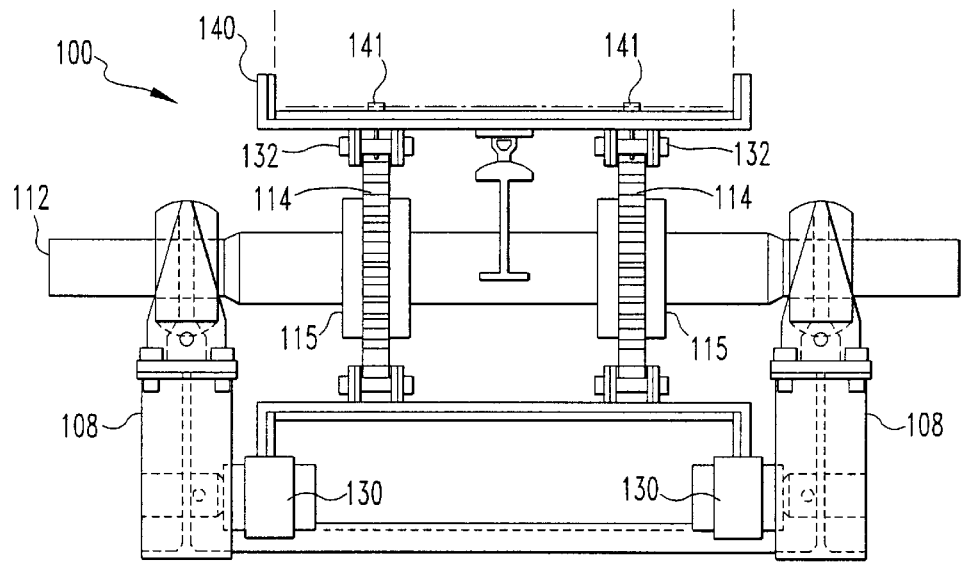
FIG. 4 is a sectional view taken along lines 4—4 in FIG. 2.
Figure 5:
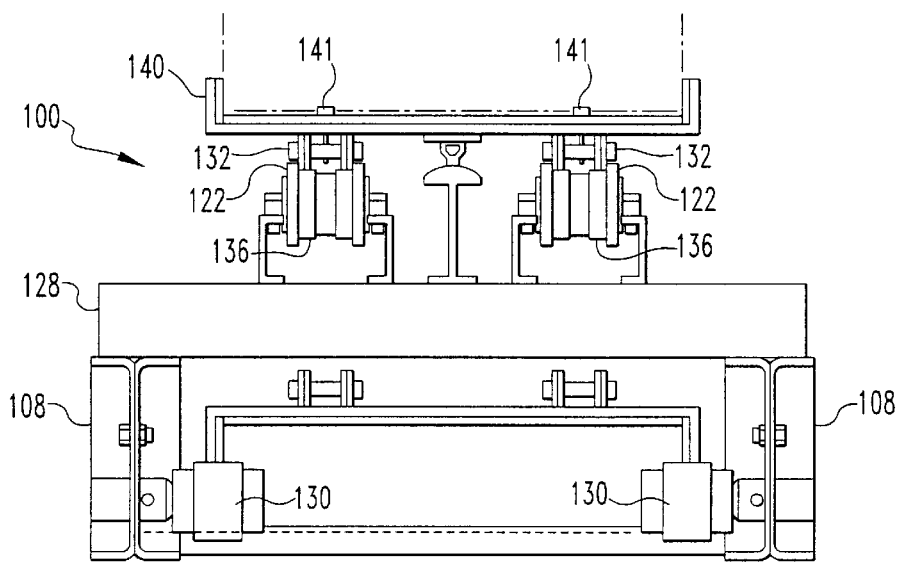
FIG. 5 is a sectional view taken along lines 5—5 in FIG. 2.
Figure 6:
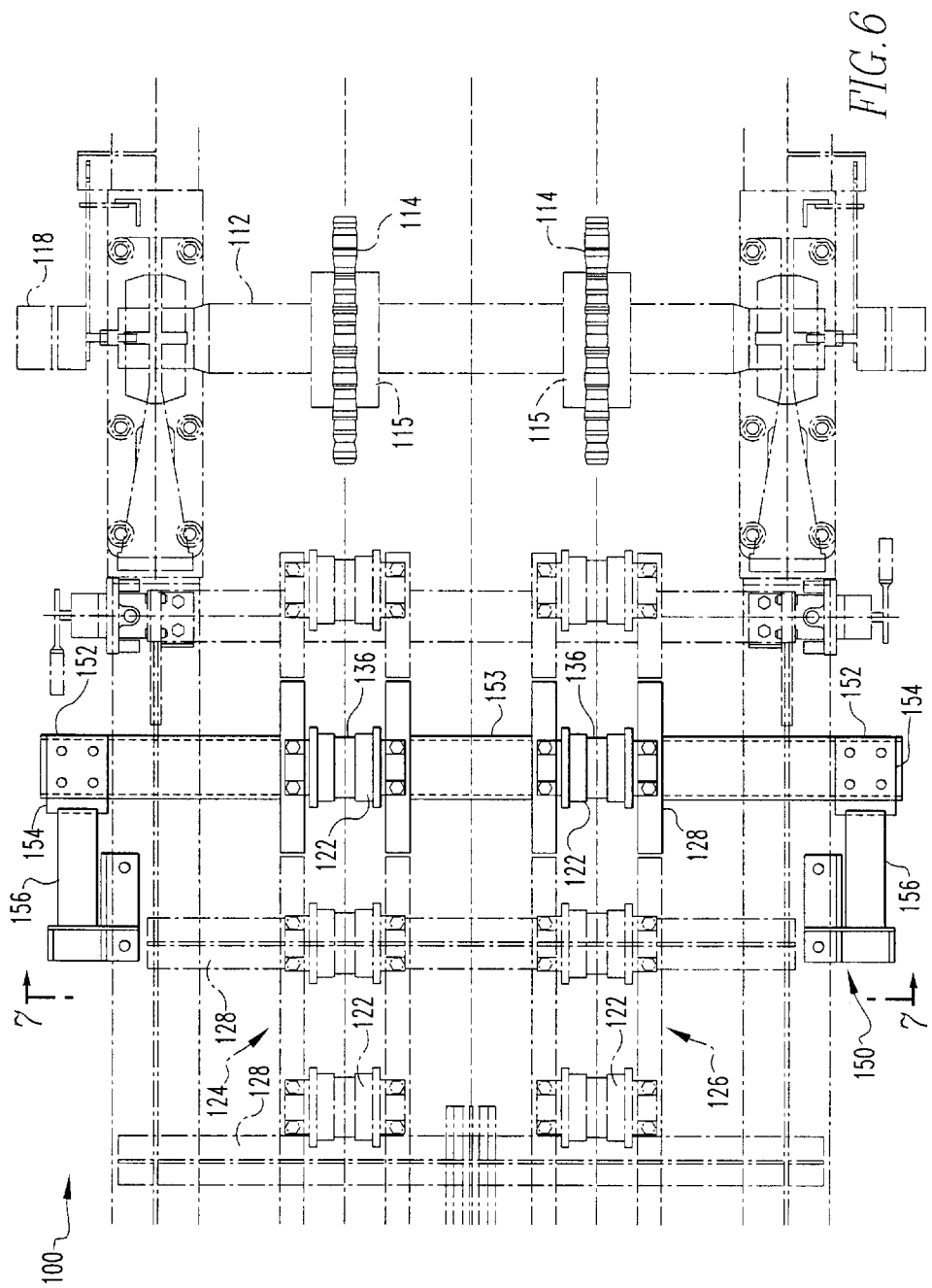
FIG. 6 is a plan view of a portion of the apron weigh feeder of FIG. 2 having an integral weigh scale assembly in accordance with the present invention.

Referring to FIGS. 2, 3, and 6–9, the apron feeder 100 includes a weigh scale assembly 150 substituted in place of one or more of the carry roller support frames 128. The weigh scale assembly 150 may be located anywhere along the feeder frame 106 between the head drive shaft 112 and the tail traction wheels 120. In FIGS. 2 and 3, the weigh scale assembly 150 is shown located near the discharge end 104 of the apron feeder 100. The weigh scale assembly 150 is preferably an integral part of the apron feeder 100, as will be appreciated by those skilled in the art. The weigh scale assembly 100 is used to measure the weight of material moving on the apron feeder 100 and provide this information to an operator of the apron feeder 100. In particular, by combining the measured weight of the material and the speed of the apron feeder 100 as measured by the speed sensor 118, a continuous indication of the mass flow of the material moving on the apron feeder 100 may be obtained and displayed, for example, visually to the operator of the apron feeder 100.

Referring specifically to FIGS. 6–9, the weigh scale assembly 150 preferably replaces a carry roller support frame 128 for one of the pairs of carry rollers 122. The weigh scale assembly 150 includes a scale support frame 152, which replaces the selected carry roller support frame 128. The scale support frame 152 supports a pair of carry rollers 122 in a similar manner to the carry roller support frame 128 that it replaces. In particular, the pair of carry rollers 122 is rotatably mounted to a cross beam 158 of the scale support frame 152.

The weigh scale assembly 150 further includes a pair of load cell plates 154 positioned between the scale support frame 152 and the respective longitudinal support beams 108 of the feeder frame 106. The scale support frame 152 is mounted to the respective support beams 108 of the feeder frame 106 through the load cells 154. The load cells 154 located on each of the support beams 108 are operatively connected to a pair of feeder scales 156, respectively. The load cells 154 are configured to generate respective output signals indicative of the weight of the material passing over the load cells 154. The load cells 154 may also be operatively connected to a single feeder scale 156. The feeder scales 156 are mounted on the support beams 108 adjacent the ends of the scale support frame 152 and display the output signals generated by the load cells 154 as the weight of the material passing over the scale support frame 152.

The feeder scales 156 and load cells 154 may be conventional in the art such as a Ramsey IDEA belt scale system that includes a dual load cell configuration. The weight of material as measured by the load cells 154 and displayed by the feeder scales 156 may be provided as input signals to a central control unit 160, such as a programmable computer (PC) or programmable logic controller (PLC), as shown in FIG. 3. The PC/PLC 160 may be used to continuously monitor the weight of the material measured by the weigh scale assembly 150 and the speed of the apron feeder 100 as measured by the speed sensor 118 and calculate the mass flow rate of the material moving over the apron feeder 100. For this purpose, the PC/PLC 160 may control the speed of the apron feeder 100 and, hence, mass flow rate of material by sending a control signal to the drive motor 116, which is preferably a variable speed drive motor as indicated previously. The speed sensor 118 is also connected to the PC/PLC 160 to provide the rotational speed (i.e., speed output signal) of the head drive shaft 112 as a second input signal to the PC/PLC 160. Accordingly, the drive motor 116 is also operatively connected to the PC/PLC 160.

Figure 9:
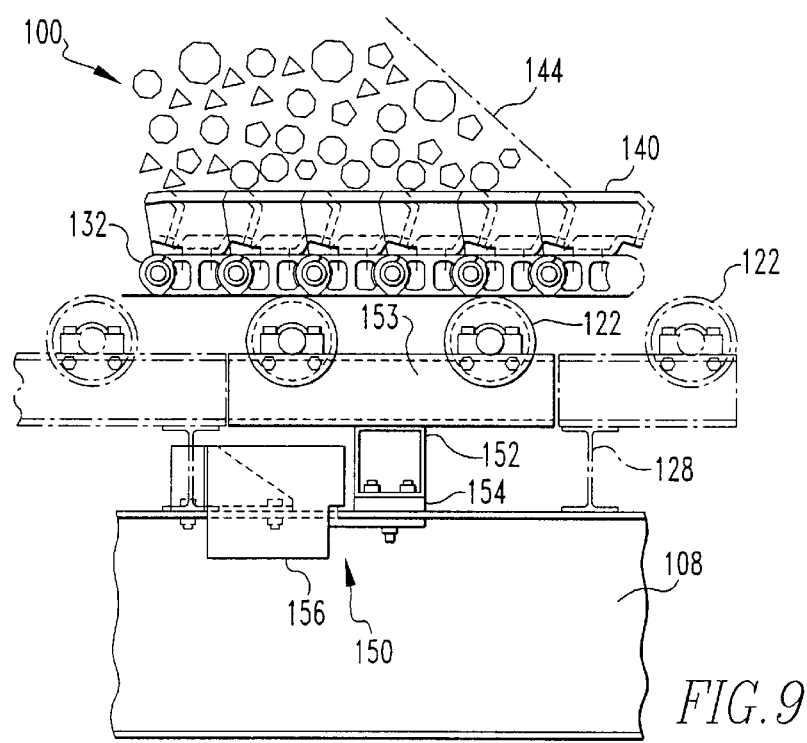
FIG. 9 is an elevational view of the portion of the apron weigh feeder having the weigh scale assembly of FIG. 6, and further showing an alternative arrangement for the weigh scale assembly.

FIG. 9 shows an alternative embodiment for the weigh scale assembly 150. In the arrangement shown in FIG. 9, the weigh scale assembly 150 includes a scale support frame 152 that supports two adjacent pairs of carry rollers 122. Thus, the scale support frame 152 supports a total of four (4) carry rollers 122. The scale support frame 152 is connected to one or more feeder scales 156 through a pair of load cells 154 in a similar manner to the weigh scale assembly 150 shown in FIG. 8. As will be appreciated by those skilled in the art, the cross beam 153 of the scale support frame 152 may be extended horizontally to include additional adjacent pairs of carry rollers 122. In addition, the scale support frame 152 may be extended horizontally to replace adjacent carry roller support frames 128 in accordance with the present invention.

Figure 10:
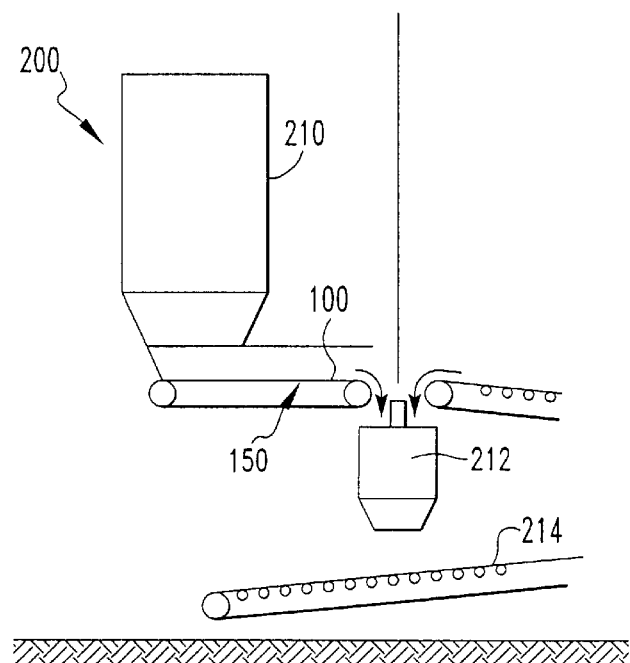
FIG. 10 is a schematic view of an improved weighing arrangement for weighing heavy bulk materials provided by the apron weigh feeder of the present invention.

FIG. 10 shows an improved weighing arrangement 200 provided by the present invention in comparison to the weighing arrangement 10 shown in FIG., 1. In contrast to the weighing arrangement 10 shown in FIG. 1, the apron feeder 100 of the present invention permits the contents of a hopper, bin, or silo 210 to be deposited directly onto the apron feeder 100 and weighed substantially simultaneously. The material deposited on the apron feeder 100 is weighed by the weigh scale assembly 150 before being discharged to another piece of equipment such as a crusher 212, which outputs the material to a product conveyor 214. The apron feeder 100 of the present invention provides the ability to extract and weigh heavy bulk materials in one step. Because the apron feeder 100 of the present invention is a true tractor type or crawler apron feeder, it may be used in the heavy materials industry. The combined tractor type and apron weigh feeder of the present invention enables the desired output of the apron feeder 100 to be measured in tons per hour, which can be varied by adjusting the depth of the material on the carrying surface of the apron feeder 100 or by varying the speed of the apron feeder 100 through a variable speed drive system as mentioned previously. In addition, as shown in FIG. 10, a major benefit of the apron feeder 100 is that less vertical space is required than the weighing arrangement shown in FIG. 1. The requirement for a "weighing" belt conveyor as used in FIG. 1 is completely eliminated by the weighing apron feeder 100 of the present invention.

While preferred embodiments of the present invention were described herein, various modifications and alterations of the present invention may be made without departing from the spirit and scope of the present invention. The scope of the present invention is defined in the appended claims and equivalents thereto.

I claim:

1. An apron weigh feeder for simultaneously transporting and weighing heavy bulk materials, comprising:
   a feeder frame;
   a head drive shaft mounted rotatably on the feeder frame, the head drive shaft having a drive sprocket mounted thereto;
   a tail traction wheel mounted rotatably on the feeder frame at an opposite end of the feeder frame from the head drive shaft, the tail traction wheel aligned with the drive sprocket;
   a plurality of carry rollers located and aligned between the drive sprocket and tail traction wheel, the carry rollers supported rotatably by a plurality of carry roller support frames, respectively, the carry roller support frames each mounted on the feeder frame;
   an endless crawler chain reeved about the drive sprocket and tail traction wheel, the crawler chain in operation of the feeder moving in a chain path comprised of an upper rectilinear path and a lower rectilinear path connected by two curvilinear end paths, and the crawler chain supported by the carry rollers while moving in the upper rectilinear path;
   a plurality of flights fixed to the crawler chain to define a carrying surface of the feeder; and
   a weigh scale assembly substituted in place of at least one of the carry roller support frames, the weigh scale assembly operable to generate an output signal indicative of the weight of bulk material passing over the weigh scale assembly.

2. The apron weigh feeder of claim 1, wherein the weigh scale assembly comprises a scale support frame substituted in place of the at least one carry roller support frame and a load cell positioned between the scale support frame and the feeder frame, the load cell configured to generate the output signal indicative of the weight of bulk material passing over the scale support frame and load cell.

3. The apron weigh feeder of claim 2, wherein the load cell is operatively connected to a feeder scale configured to display the output signal as the weight of bulk material.

4. The apron weigh feeder of claim 2, wherein the weigh scale assembly comprises a pair of load cells positioned between the scale support frame and the feeder frame and located on opposite longitudinal sides of the feeder.

5. The apron weigh feeder of claim 2, wherein the scale support frame supports at least two adjacent carry rollers.

6. The apron weigh feeder of claim 1, further comprising a plurality of return rollers mounted rotatably on the feeder frame below the carry rollers.

7. The apron weigh feeder of claim 6, wherein sidewalls of the flights are supported by the return rollers as the crawler chain moves along the lower rectilinear path.

8. The apron weigh feeder of claim 1, further comprising a speed sensor connected to the head drive shaft and configured to generate an output signal indicative of the rotational speed of the head drive shaft, and control means operatively connected to the weigh scale assembly and speed sensor for receiving the output signals from the weigh scale assembly and speed sensor, the control means configured to calculate the mass flow rate of bulk material carried by the feeder based on the output signals.

9. The apron weigh feeder of claim 1, wherein the feeder includes an extraction end for receiving bulk material onto the flights and a discharge end from which bulk material is discharged from the feeder, and wherein the weigh scale assembly is located substantially at the discharge end of the feeder.

10. An apron weigh feeder for simultaneously transporting and weighing heavy bulk materials, comprising:
- a feeder frame;
- a head drive shaft mounted rotatably on the feeder frame, the head-drive shaft having at least two drive sprockets mounted thereto;
- at least two tail traction wheels mounted rotatably on the feeder frame at an opposite end of the feeder frame from the head drive shaft, the tail traction wheels aligned with the drive sprockets, respectively;
- a plurality of carry rollers arranged in substantially parallel rows aligned between respective pairs of drive sprockets and tail traction wheels, the carry rollers supported rotatably by a plurality of carry roller support frames mounted on the feeder frame;
- an endless crawler chain reeved about each of the respective pairs of drive sprockets and tail traction wheels, the crawler chains in operation of the feeder, each moving in a chain path comprised of an upper rectilinear path and a lower rectilinear path connected by two curvilinear end paths, and the crawler chains supported by the carry rollers while moving in the upper rectilinear path;
- a plurality of flights fixed to the crawler chains to define a carrying surface of the feeder; and
- a weigh scale assembly substituted in place of at least one of the carry roller support frames, the weigh scale assembly operable to generate an output signal indicative of the weight of bulk material passing over the weigh scale assembly.

11. The apron weigh feeder of claim 10, wherein the weigh scale assembly comprises a scale support frame substituted in place of the at least one carry roller support frame and a load cell positioned between the scale support frame and the feeder frame, the load cell configured to generate the output signal indicative of the weight of bulk material passing over the scale support frame and load cell.

12. The apron weigh feeder of claim 11, wherein the load cell is operatively connected to a feeder scale configured to display the output signal as the weight of bulk material.

13. The apron weigh feeder of claim 11, wherein the weigh scale assembly comprises a pair of load cells positioned between the scale support frame and the feeder frame and located on opposite longitudinal sides of the feeder.

14. The apron weigh feeder of claim 11, wherein the scale support frame supports at least two adjacent pairs of carry rollers.

15. The apron weigh feeder of claim 10, further comprising a plurality of return rollers mounted rotatably on the feeder frame below the carry rollers.

16. The apron weigh feeder of claim 15, wherein sidewalls of the flights are supported by the return rollers as the crawler chains move along their respective lower rectilinear paths.

17. The apron weigh feeder of claim 10, further comprising a speed sensor connected to the head drive shaft and configured to generate an output signal indicative of the rotational speed of the head drive shaft, and control means operatively connected to the weigh scale assembly and speed sensor for receiving the output signals from the weigh scale assembly and speed sensor, the control means configured to calculate the mass flow rate of bulk material carried by the feeder based on the output signals.

18. The apron weigh feeder of claim 10, wherein the flights extend transversely across the crawler chains.

19. The apron weigh feeder of claim 10, wherein the feeder includes an extraction end for receiving bulk material onto the flights and a discharge end from which bulk material is discharged from the feeder, and wherein the weigh scale assembly is located substantially at the discharge end of the feeder.

20. An apron weigh feeder for simultaneously transporting and weighing heavy bulk materials, comprising:
- a feeder frame;
- a head drive shaft rotatably mounted on the feeder frame, the head drive shaft having at least two drive sprockets mounted thereto;
- at least two tail traction wheels rotatably mounted on the feeder frame at an opposite end of the feeder frame from the head drive shaft, the tail traction wheels aligned with the drive sprockets, respectively;
- a plurality of carry rollers arranged in substantially parallel rows aligned between respective pairs of drive sprockets and tail traction wheels, the carry rollers supported rotatably by a plurality of carry roller support frames mounted on the feeder frame;
- an endless crawler chain reeved about each of the respective pairs of drive sprockets and tail traction wheels, the crawler chains in operation of the feeder each moving in a chain path comprised of an upper rectilinear path and a lower rectilinear path connected by two curvilinear end paths, and the crawler chains supported by the carry rollers while moving in the upper rectilinear path;
- a plurality of flights extending transversely across and fixed to the crawler chains to define a carrying surface of the feeder;
- a plurality of return rollers rotatably mounted on the feeder frame below the carry rollers; and
- a weigh scale assembly substituted in place of at least one of the carry roller support frames, the weigh scale assembly comprising a scale support frame substituted in place of the at least one carry roller support frame, a load cell positioned between the scale support frame and the feeder frame, and a feeder scale operatively connected to the load cell, the load cell configured to generate an output signal indicative of the weight of bulk material passing over the scale support frame for receiving by the feeder scale, which displays the output signal as the weight of bulk material.

* * * * *

UNITED STATES PATENT AND TRADEMARK OFFICE
CERTIFICATE OF CORRECTION

PATENT NO.    : 6,662,930 B2
DATED         : December 16, 2003
INVENTOR(S)   : Martin A. Yester It is certified that error appears in the above-identified patent and that said Letters Patent is hereby corrected as shown below:

<u>Title page,</u>
Item [56], References Cited, U.S. PATENT DOCUMENTS, "Richard" should read -- Kane --.

Signed and Sealed this

Fourth Day of May, 2004

JON W. DUDAS
*Acting Director of the United States Patent and Trademark Office*